Patented June 27, 1939

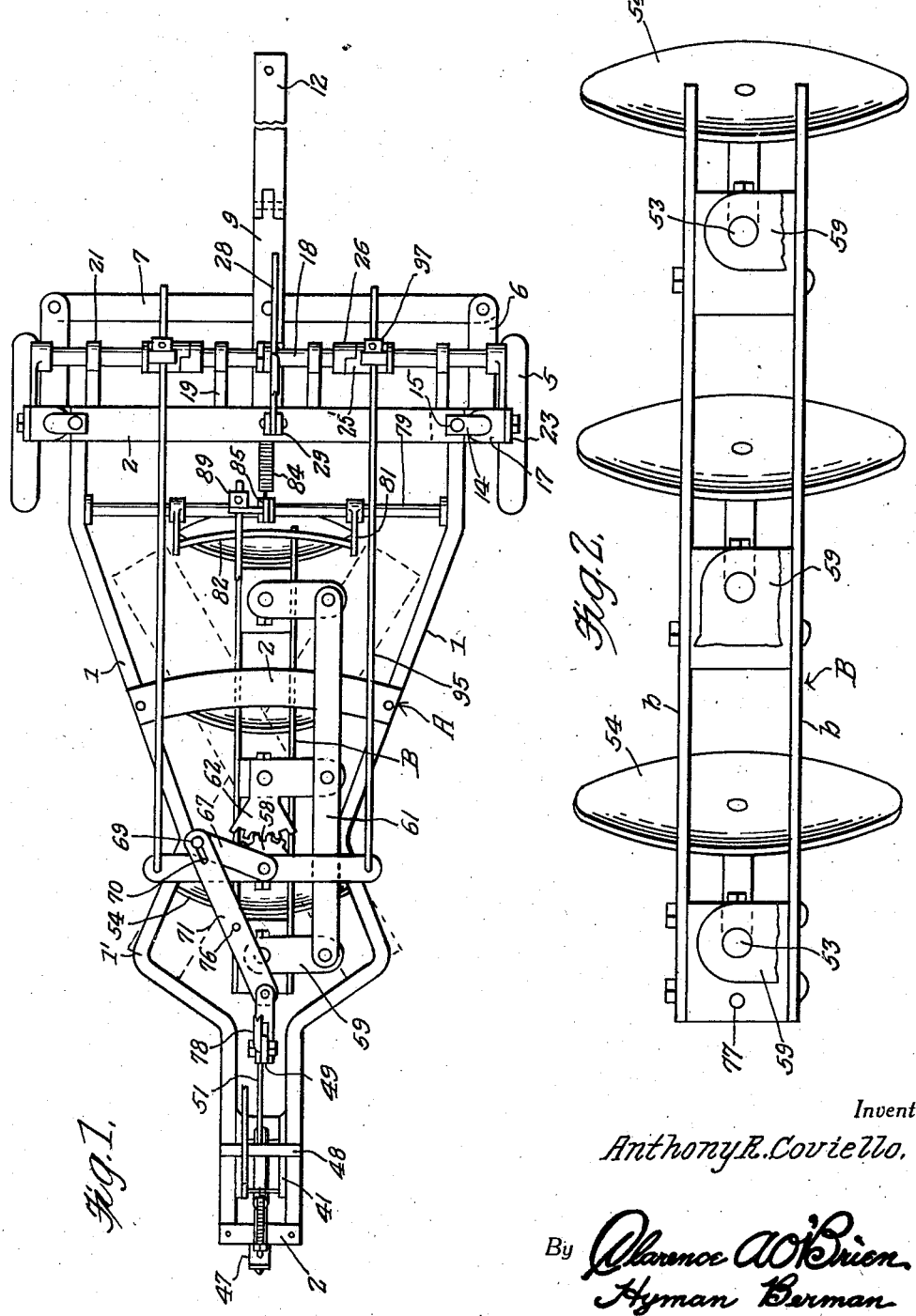

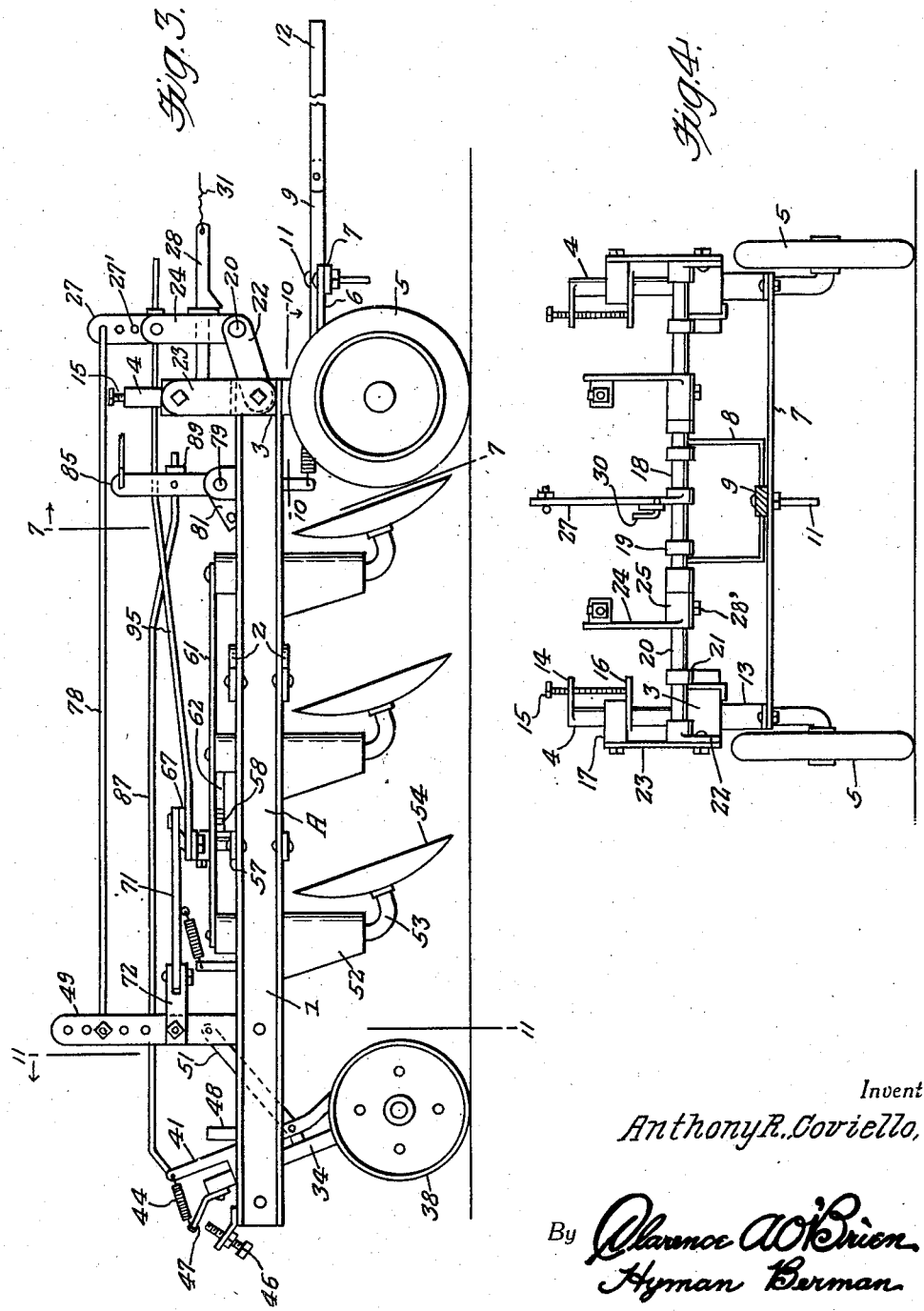

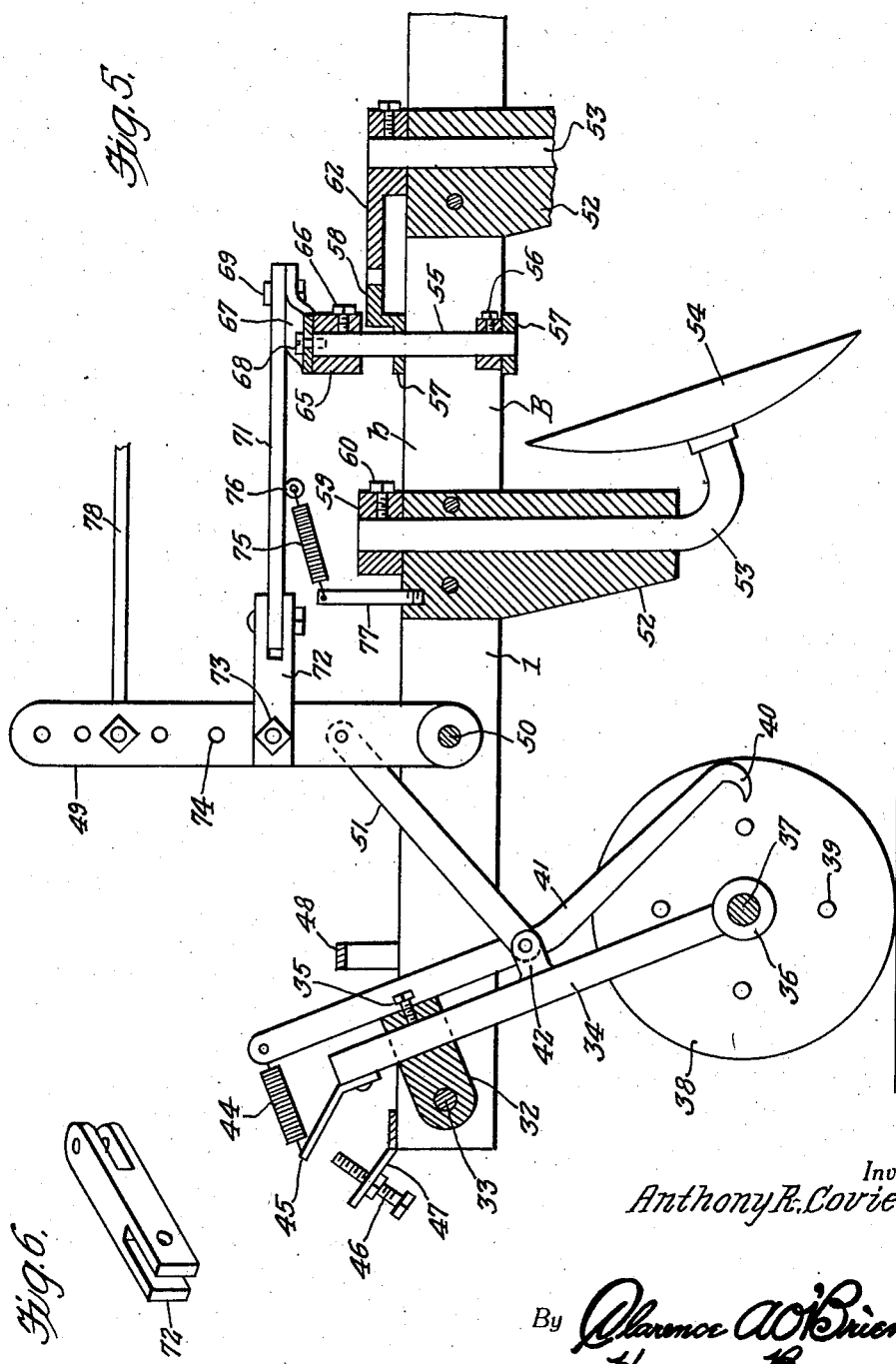

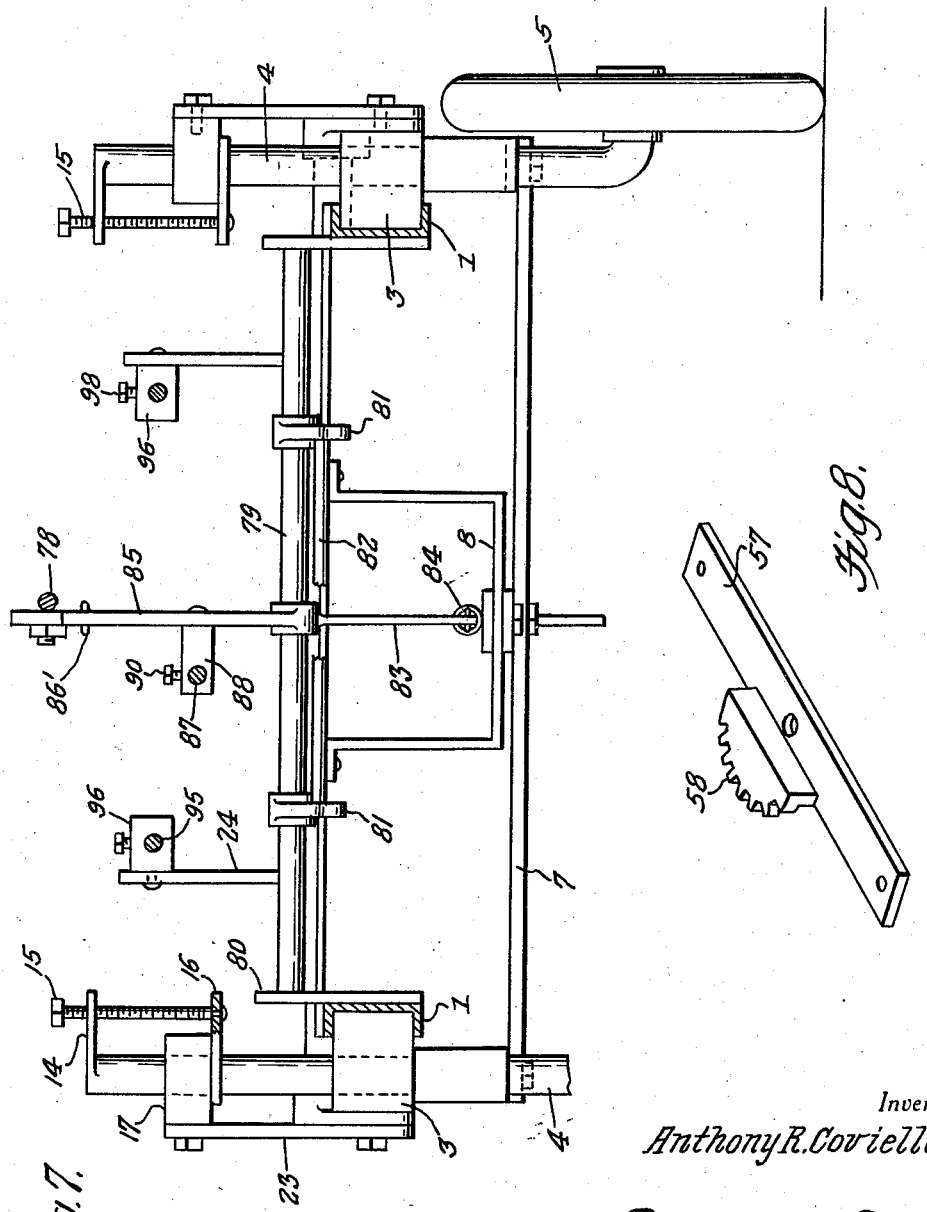

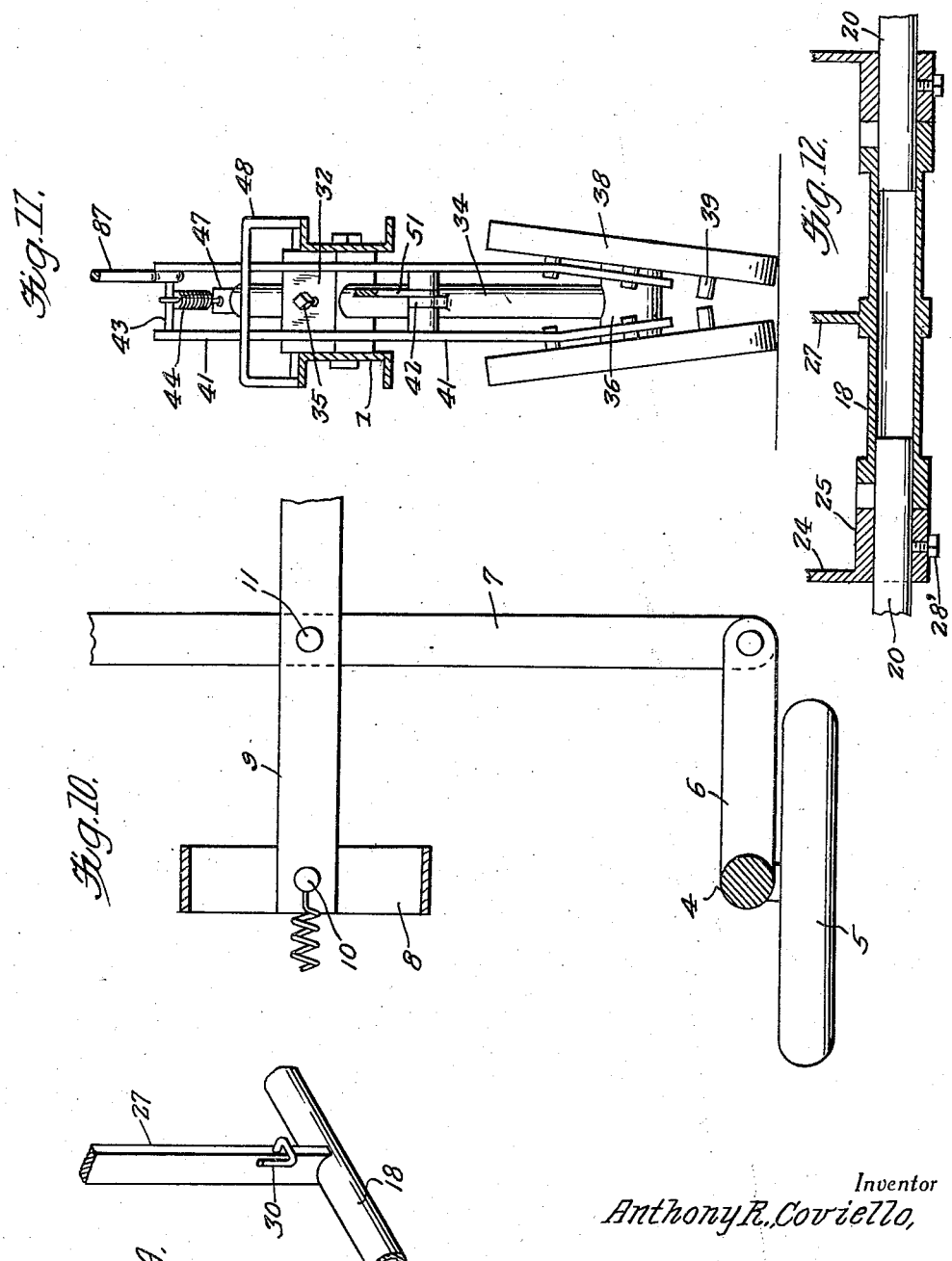

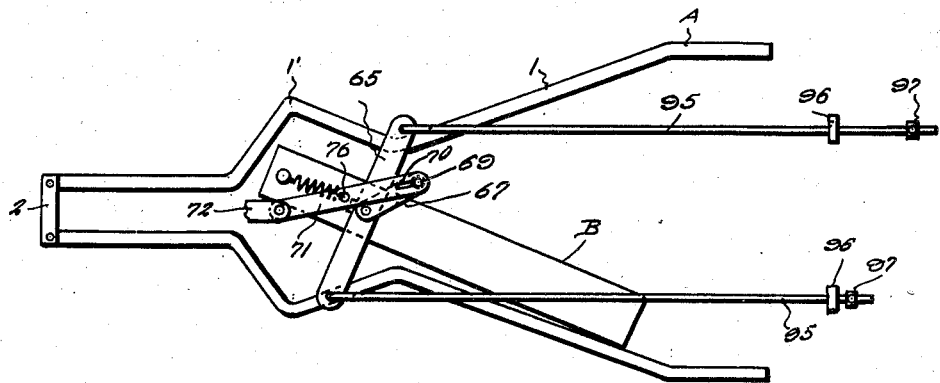
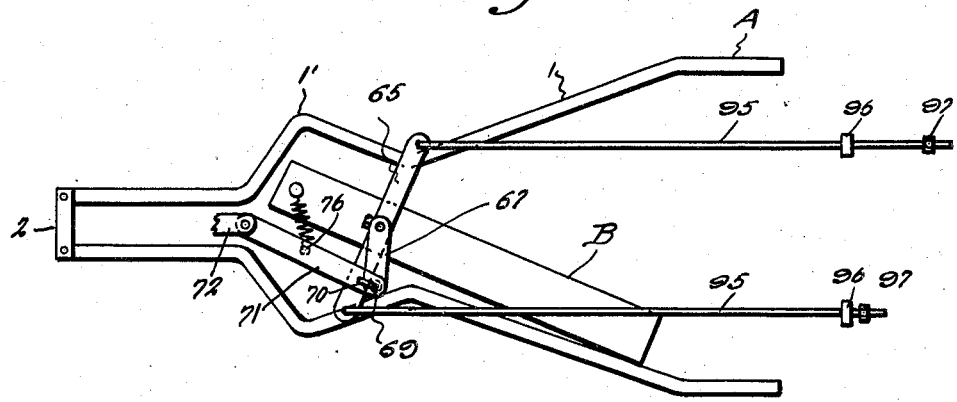

2,163,832

UNITED STATES PATENT OFFICE 2,163,832

PLOW

Anthony Robert Coviello, Tulare, Calif., assignor of fifteen per cent to Ward G. Rush, Tulare, Calif.

Application January 3, 1938, Serial No. 183,212

7 Claims. (Cl. 97—32)

This invention relates to a plow having a plurality of disks, with manually controlled means for lifting the plows by means actuated by one of the ground wheels and automatic means operated by the last-mentioned means for shifting the plow beam and the plows, when the same are lifted, whereby the plow can be turned at the end of a row and started back for the return trip with the plows throwing the dirt into the furrows previously plowed.

Another object of the invention is to provide means for leveling the frame when either front wheel is in a furrow and also to provide adjustable means for regulating the depth the plows will enter the ground.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of the invention.

Figure 2 is a plan view of the plow beam with the plows carried thereby.

Figure 3 is an elevation of the invention.

Figure 4 is a front view thereof.

Figure 5 is a longitudinal sectional view through the rear portion of the invention.

Figure 6 is a view of the forked bar which connects the vertical lever with the spring actuating lever for turning the plows.

Figure 7 is a section on the line 7—7 of Figure 3.

Figure 8 is a view of the stationary bar carrying the stationary segmental gear.

Figure 9 is a detail view of the central shaft at the front of the beam with a portion of the lever connected therewith.

Figure 10 is a section on the line 10—10 of Figure 3.

Figure 11 is a section on the line 11—11 of Figure 3.

Figure 12 is a detail sectional view of the hollow shaft, the ends of which form bearings for the front lifting shafts.

Figure 13 is a diagrammatic plan view showing the position of the parts for swinging the plow beam as the plow frame is being raised.

Figure 14 is a similar view showing how the spring has moved the link to a position ready to move the plow beam upon a raising of the frame, this view showing the parts in position with the frame in lowered position.

In these drawings the plow beam and the plow disks are shown as in a central or neutral position but it will be understood that when the plow is in use the beam will be in an inclined position either at the right of the frame or at the left thereof with the plow disks tilted or inclined to properly engage and turn the soil or dirt in the usual manner.

In these drawings, the letter A indicates the frame of the device which is preferably composed of the longitudinally extending side bars 1 each of which has a straight front end, a rearwardly and inwardly extending intermediate part which joins an outwardly extending substantially V-shaped part 1' which in turn joins a straight rear portion. The parts 1' form an enlarged space in which operates the rear end of the plow beam B as the beam is turned on its pivot. The frame also includes the cross members 2 which connect the side members 1 together, the cross members being of different shapes as shown.

The front ends of the side members 1 have connected therewith the blocks 3 having vertical holes therein for slidingly receiving the posts 4, each of which has its lower end bent outwardly to form a spindle for a wheel 5. Forwardly extending arms 6 are connected with the lower portions of the posts and these arms are connected together by the tie rod or bar 7. A centrally arranged stirrup 8 depends from the front cross bar 2 and a draw bar 9 has its rear end pivotally connected with the stirrup as shown at 10 in Figure 10 and an intermediate part of the draw-bar carries a long pin 11 which passes through a centrally arranged hole in the tie rod 7. A tongue or connecting bar 12 is pivoted to the front end of the draw bar for connection with a tractor or other pulling device and as will be seen when the bars 9 and 12 are moved in one direction or the other the tie bar 7 will cause the wheels to turn in the same direction as the posts turn in the bearing members 3. Thus the apparatus can readily make a turn. An upper shoulder forming enlargement 13 is formed on each post, the shoulder forming a rest for a block 3 when the frame is in its lowered position. A horizontal projection 14 is formed on the top of each post and has a threaded hole therein for receiving a screw 15, the lower end of which passes through a hole formed in a plate 16 which has a large hole therein through which the post passes so that by turning the screw the plate 16 can be adjusted on the post. A block 17 has a large hole therein through which the post passes, the block being located between the members 14 and 16.

A transverse centrally arranged shaft 18 is supported in front of the front cross bar 2 by the bearing brackets 19. This shaft 18 is of hollow construction and its end portions receive the inner ends of the shafts 20 which are in alignment with the shaft 18 and have parts supported for rotary movement in the bearing members 21 extending forwardly from the blocks 3. The outer end of each shaft 20 has a rearwardly extending crank arm 22 rigidly connected therewith and a link 23 has one end pivotally connected with the outer end of each crank arm and its other end is pivotally connected with the block 17. Thus by rocking the shaft 20 in one direction the crank arm will cause the link 23 to cause the block 17 to bear against the plate 16 and further rocking movement of the shaft 20 will then cause the crank arm 22 and link 23 to raise the bearing 21 which causes an upward movement of the block 3 and the side member 1 to which the block is connected. It will also be seen that raising of the plate 16 by the screw 15 will cause an upward movement of the block 17 which causes the link 23, through means of the crank arm 22 and the bearing 21 and the shaft 20 to raise the block and the front end of the member 1. A lever arm 24 has a tubular part 25 at its lower end through which the shaft 20 passes and this tubular part 25 has a clutch part 25' at its inner end for engaging a clutch part 26 on each end of the shaft 18, these clutch parts being so formed that when the shaft 18 is rocked by rearward movement of the lever 27 having its lower end attached to the shaft 18 such rocking movement will be communicated to the lever arms 24 and thus to each shaft 20. Each tubular part 25 is connected to its shaft 20 by a set screw 28'. Thus when the lever 27 is moved rearwardly the shaft 18 will cause movement of both of the shafts 20 which will result in raising of the front end of the frame but said shaft 18 can move in an opposite direction without moving the shafts 20. A latch plate 28 has its rear end pivoted to the ears 29 on the front cross piece 2 and has a projecting part engaging the keeper member 30 on the lower part of the lever 27 to hold the lever in its rearward position. A cable 31 is connected with the front end of the latch member for enabling an operator to lift the same into inoperative position.

A block 32 has its rear end pivotally supported between the rear ends of the frame members 1 by a pin 33 and a bar or post 34 passes through a hole in the forward part of this block and is held in adjusted position therein by a set screw 35, as shown in Figure 5. This bar has at its lower end a horizontally arranged supporting member 36 for the shaft 37 to the ends of which are rotatably arranged the wheels 38, the wheels diverging upwardly as shown in Figure 11. The inner faces of the wheels carry the pins 39 for engaging the cam parts 40 formed on the lower ends of a pair of spaced members 41 pivoted intermediate their ends on opposite sides of a forwardly extending ear 42 formed on an intermediate part of the rod or post 34. The upper ends of these two members 41 are connected together by a cross rod 43, see Figure 11, and a spring 44 has one end connected with this cross rod and its other end is connected to an upwardly and rearwardly extending member 45 connected to the upper end of the rod or post 34, see Figure 5. An upwardly and forwardly sloping set screw 46 is carried by a bracket 47 attached to the rear end of the frame and acts as an adjustable stop for engaging the member 45 to limit the rearward movement of this member 45 and forward and upward movement of the rear wheels 38. As will be seen the spring 44 acts to hold the cam parts 40 out of the path of the pins 39 on the rear wheels and forward movement of the upper portions of the members 41 is limited by the bridge 48 extending across the rear portion of the frame. This bridge acts to release the cams 40 from the pins 39 when the post 34 is moved toward vertical position to a certain extent. A lever 49 is pivoted between the rear portions of the members 1 in front of the members 34 and 41, by a pin 50 which passes through the lower end of the lever and is carried by the frame members 1. A link 51 connects the lower part of this lever with the ear 42.

The plow frame B is composed of the elongated and parallel members b and the block-like upper ends of the tubular supporting members 52 which form bearings for the shanks 53 of the disk plows 54. While the drawings show the beam as carrying three plows it will, of course, be understood that the beam can be constructed to carry any reasonable number of plows. A pivot pin 55 is fastened to the beam between the rearmost plow and the next plow, as shown at 56 in Figure 5, and said pin is rotatably arranged in the cross pieces 57 extending across the frame adjacent the front ends of the parts 1' of the side members 1 and the upper cross piece 57 has a segmental stationary gear 58 connected to the central part of its front edge as shown more particularly in Figure 8. As will be seen the pivotal point 55 of the beam B is spaced in front of the rear plow with the rear end of the beam operating in the widened part of the frame formed by the parts 1' of the side members 1. A short arm 59 is connected to the upper end of each plow shank by a screw 60, the arm and screw acting to hold the shank in place in its member 52 and a link 61 connects the outer ends of the three arms together. The central arm has a segmental gear 62 extending at right angles therefrom and meshing with the stationary gear 58, these parts being so arranged that as the beam is swung on the pivot 55 the gear 58 will cause the gear 62 to move the shank 53 and arm 59 of the center plow and this movement will be communicated by the link 61 to the other arms and thus all three of the plows will be adjusted from a position where they will throw the dirt to one side to a position where they will throw the dirt to the opposite side.

A cross bar 65 has its central portion fastened to the upper end of the pivot pin 55 by a screw 66 as shown in Figure 5 and a short arm 67 is pivoted at one end to the upper end of the pin 55 by a screw 68 and the outer end of this short arm 67 has a bolt 69 passing therethrough which also passes through a slot 70 in the front end of a link 71 which is pivoted at its rear end between the prongs of the forked front end of a bar 72, shown in detail in Figure 6, the rear forked end of the bar fitting over an intermediate portion of the lever 49 to which it is connected by a bolt 73 passing through one hole of a longitudinally extending row of holes 74 in the lever 49, as shown in Figure 5. A spring 75 is connected to an intermediate portion of the link 71 as shown at 76 and the other end of the spring is connected to a small post 77 extending upwardly from the rear end of the plow beam B. The lower end of the bolt 69 extends downwardly a sufficient distance to engage the cross bar 65 when the link 71 and arm 67 move rearwardly as lever 49 swings rearwardly as the plow is being raised, so as to move the plow beam on the pivot 55 from one position to its other position. As the plow beam swings from one position to the other it will tension the spring 75 so that this spring will change the position of lever 71 from one side of the frame to the opposite side when the plow frame is dropped which causes the lever 49 and link 71 to move forwardly. A link 78 connects the lever 49 with the front lever 27, the ends of the link being adapted to engage suitable ones of the holes 74 in the lever 49 and the row of holes 27' in the lever 27. This link communicates the movement of one lever to the other.

A shaft 79 extends across the forward part of the frame A and is supported for rocking movement in the brackets 80 attached to the side members 1 and this shaft has attached thereto the pair of spaced locking cams 81 which are connected together by a curved bar 82. These cams are spaced from the side members 1 a sufficient distance to hold the front end of the beam B between a side member 1 and a cam so that the cams will hold the plow beam in a forwardly and outwardly sloping position, as shown by the dotted lines B' in Figure 1. An arm 83 depends from the shaft 79 and is connected to the stirrup 8 by a spring 84 which tends to hold the shaft in a position with the cams lowered to engage the front end of the beam. A lever 85 is connected at its lower end to the shaft 79 and a cable 86 is connected to the upper end of the lever 85 for enabling an operator to pull the lever forward so as to rock the shaft to release the cams from locking position. A rod or link 87 is pivotally connected with the cross bar 43 of the members 41 and extends forwardly through a hole in a block 88 attached to the lever 85 and rotatably mounted thereon and a stop member 89 is adjustably connected to the front part of the rod or link 87 by a set screw 90.

In using the device the parts are operated to place the plow beam in an inclined position say at the right of the frame, as shown in dotted lines in Figure 1. Figure 14 also shows the parts with the frame lowered and the plows in plowing position. The disk plows will make three furrows and by having the pivotal point 55 of the beam arranged as shown in Figure 5 the rear plow will be in a position to make a furrow for the rear wheels to follow and this will happen whether the beam is in its right hand position or in its left hand position. As the beam is turned on the pivot the gear arrangement 58 and 62, the arms 59 and link 61 will automatically adjust the disks into the proper plowing position for this position of the beam. The arrangement of the rear wheels will take care of side draft (or tailing) of plow for one side as well as the other. When the end of the field is reached the operator pulls upon the cable 86 to cause lever 85 to rock shaft 79 to lift the locking cams on shaft 79 so as to free the front end of the plow beam. This movement of the lever 85 is communicated to the members 41 by the link 87 so that the cam ends 40 of these members 41 will move into the path of the pins 39 and will be engaged by some of said pins and this will result in said members 41 being moved by the pins, caused by the rotary movement of the rear wheels and this movement of the members 41 will be communicated to the rear post or bar 34 and move the same toward a vertical position and this will raise the rear end of the frame and the link 51 will move the lever 49 rearwardly which movement is communicated by the link 78 to the lever 27. The rearward movement of the lever 27 turns the shaft 18 causing the clutch parts thereof to engage and move the clutch parts of the levers 24 which results in rotary movement of the shafts 20 and thus the front end of the frame is lifted by the crank arms 22, links 23 and the blocks 17. When the lever 27 is moved rearwardly to a certain extent the latch member 28 will engage the keeper 30 and thus the parts will be held in position with the frame in raised position and the plows above the ground. When the upper ends of the members 41 engage the bridge 48 said bridge will move said members 41 to release the cams 40 from the pins 39 so that the wheels 38 can rotate with the frame in raised position. As lever 49 is moved rearwardly by link 51 as the post 34 moves toward the vertical position to raise the rear end of the frame, said lever 41 exerts a pull upon the link 71 and arm 67 so that the lower end of the bolt 69 will engage the cross bar 65 which moves the bar 65 and the plow beam from the position shown in Figure 14 to an opposite inclined position with the beam arranged adjacent the opposite side of the frame. Of course, the movement of the cross bar 65 causes movement of the pivot member 55 to which it is connected and this movement of the pivot member causes movement of the beam. As the beam swings from one inclined position to the other the rear ends of the beam will tension the spring 75, as shown in Figure 13, so that when the frame is dropped and the link 71 is moved forwardly by lever 49, the spring will swing lever 71 and arm 67 to the other inclined position, as shown in Figure 14, with the bolt 69 in position to swing the cross bar 65 when the frame is again raised. Upon release of the cable 86, the spring 84 will move the cam shaft in the other direction so as to cause one of the cams to engage the front end of the beam in its new inclined position.

Of course, during this movement of the beam the plow disks will be reversed to the new plowing position. After the apparatus has been turned around to start on the return trip the cable 31 is pulled upon to release the latch member 28 so that the parts can return to the position with the frame in lowered position and the plow disks engaging the ground.

A rod 95 is connected to each end of the cross member 65 and these rods pass through holes in blocks 96 rotatably connected with the upper ends of the lever arms 24 and the front end of each rod 95 has a stop block 97 adjustably connected thereto by a screw 98. Thus these rods will not interfere with rearward movement of the lever arms 24 and by adjusting each stop member 97 on the rod the frame can be leveled when one of the front wheels is in a furrow which would tend to make the frame slope if it was not leveled by adjusting this stop member in order to hold a lever arm 24 in position with the low side of the frame raised by the crank arm 22 and link 23. Of course, these rods 95 are moved by movement of the bar 65 and if neither side of the frame is to be raised relative to the other side, the stop members 97 are moved to a position where they will not engage the levers 24. However, if one side of the frame is to be held in raised position during the plowing operation the stop member 97 is adjusted on the rod 95 to a position where it will prevent the lever 24 from moving forwardly to its full extent when the bar 15 is in-
clined position and the frame is dropped and
thus this side of the frame will be held in a
higher position than will the opposite side.

By adjusting the screws 15 at the front of the
frame and the screw 46 at the rear thereof the
depth of penetration of the plows can be regu-
lated.

Hooks 40 are engaged with pins 39 only when
the frame is lowered or the plows are in the
ground, by rod 87, which is connected with lever
85. When operator pulls cable 86 to release cams
81 it also engages hooks 40 with pins 39.

It is thought from the foregoing description
that the advantages and novel features of the in-
vention will be readily apparent.

It is to be understood that changes may be
made in the construction and in the combination
and arrangement of the several parts, provided
that such changes fall within the scope of the
appended claims.

Having described the invention, what is claimed
as new is:

1. A plow of the class described comprising a
frame, wheel carrying posts at one end of the
frame on which the frame is slidably supported,
a normally sloping post at the other end of the
frame pivotally supported for swinging movement
on a transverse axis, a wheel carried by the
sloping post, manually actuated means for lock-
ing the last-mentioned wheel against rotary
movement which causes the post to move toward
vertical position to raise the adjacent end of the
frame, means actuated by such movement of the
post for raising the other end of the frame, an
elongated plow beam pivoted adjacent one end
in the frame for movement about a vertical axis,
said beam when in plowing position extending at
an incline toward one side of the frame or the
other, plows having shanks pivoted in the beam,
means for shifting the beam from one plowing
position to another as the frame is being raised
and means for turning the plows from one plow-
ing position to the other as the beam is being
shifted.

2. A plow of the class described comprising a
frame, wheel carrying posts at one end of the
frame on which the frame is slidably supported,
a normally sloping post at the other end of the
frame pivotally supported for swinging move-
ment on a transverse axis, a wheel carried by
the sloping post, manually actuated means for
locking the last-mentioned wheel against rotary
movement which causes the post to move toward
vertical position to raise the adjacent end of the
frame, means actuated by such movement of the
post for raising the other end of the frame, an
elongated plow beam pivoted adjacent one end
in the frame for movement about a vertical axis,
said beam when in plowing position extending at
an incline toward one side of the frame or the
other, plows having shanks pivoted in the beam,
means for shifting the beam from one plowing
position to another as the frame is being raised
and means for turning the plows from one plow-
ing position to the other as the beam is being
shifted, said sloping post being arranged at the
rear of the frame normally sloping downwardly
and forwardly and said post being located at the
longitudinal axis of the frame, the rear plow be-
ing located rearwardly of the pivot of the beam.

3. A plow of the class described comprising a
frame, wheel carrying posts at the front of the
frame on which the frame is slidably supported, a
normally sloping post at the rear of the frame
pivotally supported for swinging movement on a
transverse axis, said post normally sloping down-
wardly and forwardly, a wheel carried by the
sloping post, an elongated plow beam pivoted ad-
jacent its rear end in the frame for movement
about a vertical axis, said beam when in plow-
ing position extending at an incline toward one
side of the frame or the other, normally engaged
latch means for holding the beam in either one of
its plowing positions, manually actuated means
for releasing the latch means, means connected
with the said manually actuated means for lock-
ing the rear wheel against rotary movement which
causes the rear post to move toward vertical
position to raise the rear end of the frame, means
actuated by such movement of the rear post for
raising the front end of the frame on the front
posts, plows having shanks pivotally arranged
in the beam and means for turning the plows
from one plowing position to another as the
beam is being shifted.

4. A plow of the class described comprising a
frame, a pair of front posts on which the front
end of the frame is slidably arranged, wheels car-
ried by the posts, means at the front of the frame
for raising the frame on said posts, a normally
downwardly and forwardly sloping rear post piv-
otally supported in the rear of the frame for
swinging movement about a transverse axis, a
wheel carried by the rear post and having pro-
jections thereon, a cam carrying member piv-
oted to the rear post, an elongated plow carrying
beam pivoted adjacent its rear end in the frame
for swinging movement about a vertical axis,
plows having shanks pivotally supported in the
beam, normally engaged latch means for hold-
ing the beam in a sloping position with its front
end adjacent one side of the frame or the other,
manually actuated means for releasing the latch
means, means connecting the manually actu-
ated means to the cam carrying member for en-
gaging the cam with a projection on the rear
wheel, which causes the rear post to move to-
ward vertical position to lift the rear end of the
frame, means for actuating the front frame lift-
ing means by such movement of the rear post,
means for swinging the plow beam from one
plowing position to the other as the rear post
moves rearwardly and means for shifting the
plows as the beam moves from one position to the
other.

5. A plow of the class described comprising
a frame, front posts on which the front part
of the frame is slidably supported, wheels car-
ried by the posts, a front shaft assembly includ-
ing a central section and a pair of end sections,
crank arms at the outer ends of the end sec-
tions, a block slidably arranged on each post,
a link connecting each crank arm with a block,
a lever connected to the central section, clutch
means for connecting the central section to the
end sections for moving the end sections from
the central section when the central section is
turned by rearward movement of the lever, latch
means for holding the lever in a position with
the front end of the frame in raised position,
an upwardly extending lever connected to each
end section, a normally downwardly and for-
wardly sloping rear post pivotally supported in
the rear of the frame for swinging movement
about a transverse axis, a wheel at the lower
end of the post having projections thereon, a
cam carrying member pivoted to the rear post,
a lever pivoted at its lower end in a rear part
of the frame, a link connecting the lever with the cam carrying member for causing movement of the rear lever by movement of the rear post, a link connecting the rear lever with the lever attached to the central section of the front shaft assembly, an elongated plow beam pivoted adjacent its rear end in the frame for movement about a vertical axis, said beam when in plowing position extending at an incline toward one side of the frame or the other, plows having their shanks pivoted in the beam, means for turning the plows from one plowing position to the other as the beam is being shifted, normally engaged latch means for holding the beam in either one of its plowing positions, manually actuated means for releasing the latch means, means connecting such manually actuated means with the cam carrying member for moving the cam into engagement with a projection on the rear wheel for locking the wheel to cause rearward movement of the rear post to lift the rear of the frame and also the front of the frame by means of the two connected levers, a cross bar connected with the pivot of the beam, means actuated by movement of the rear lever for moving the cross bar to swing the beam from one plowing position to the other, rods connected to the ends of the cross bar, perforated members carried by the levers of the end sections of the front shaft assembly and through which the rods pass and adjustable collars on the front ends of the rods.

6. A plow of the class described comprising a frame, a pair of front posts on which the front end of the frame is slidably arranged, wheels carried by the posts, means at the front of the frame for raising the same on said posts, adjustable means on each post for limiting downward movement of each side of the frame on the posts, a normally downwardly and forwardly sloping rear post pivotally supported in the rear of the frame, a wheel carried by the rear post, manually actuated means for locking the last-mentioned wheel against rotary movement which causes the post to move toward vertical position to raise the adjacent end of the frame, means actuated by such movement of the post for raising the front end of the frame, means for releasing the locking means after the frame has been raised, adjustable means for limiting forward movement of the rear post on its pivot, an elongated plow beam pivoted adjacent its rear end in the frame for movement about a vertical axis, said beam when in plowing position extending at an incline toward one side of the frame or the other, plows having shanks pivoted in the beam, means for shifting the beam from one plowing position to another as the frame is being raised and means for turning the plows from one plowing position to another as the beam is being shifted, and a spring connecting the rear end of the beam with a part of the beam shifting means for setting the beam shifting means to a new position, by movement of the beam, to cause the shifting means to move the beam when the frame is again raised.

7. A plow of the class described comprising a frame, a pair of front posts on which the front end of the frame is slidably arranged, wheels carried by the posts, means at the front of the frame for raising the same on said posts, adjustable means on each post for limiting downward movement of each side of the frame on the posts, a normally downwardly and forwardly sloping rear post pivotally supported in the rear of the frame, a wheel carried by the rear post, manually actuated means for locking the last-mentioned wheel against rotary movement which causes the post to move toward vertical position to raise the adjacent end of the frame, means actuated by such movement of the post for raising the front end of the frame, means for releasing the locking means after the frame has been raised, adjustable means for limiting forward movement of the rear post on its pivot, an elongated plow beam pivoted adjacent its rear end in the frame for movement about a vertical axis, said beam when in plowing position extending at an incline toward one side of the frame or the other, plows having shanks pivoted in the beam, means for shifting the beam from one plowing position to another as the frame is being raised and means for turning the plows from one plowing position to another as the beam is being shifted, and a spring connecting the rear end of the beam with a part of the beam shifting means for setting the beam shifting means to a new position, by movement of the beam, to cause the shifting means to move the beam when the frame is again raised, said plow turning means including a laterally extending arm connected with each plow shank, a link connecting the arms together, a segmental gear connected to one arm and a stationary segmental gear supported by a frame part and meshing with the first-mentioned gear.

ANTHONY ROBERT COVIELLO.